Jan. 24, 1961    G. W. HARDY    2,968,851
CABLE AND TUBE ANCHOR
Filed Aug. 25, 1958
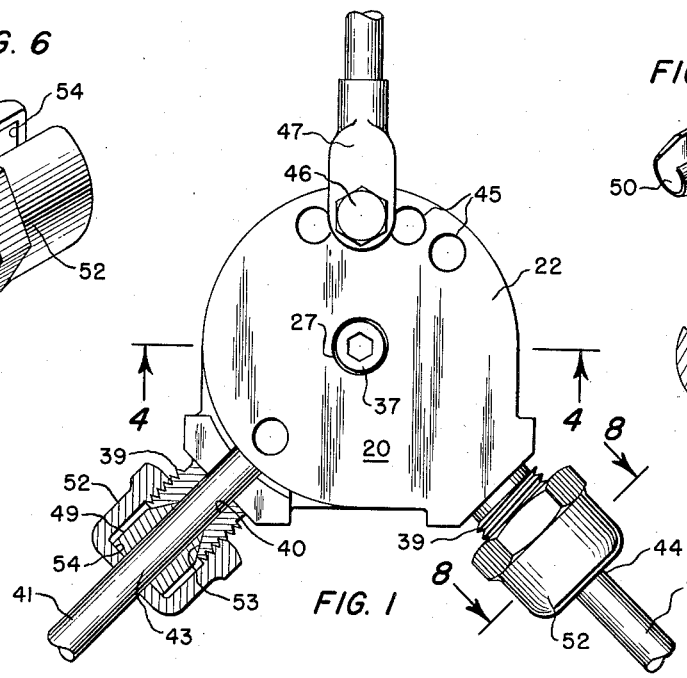
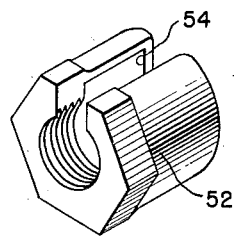
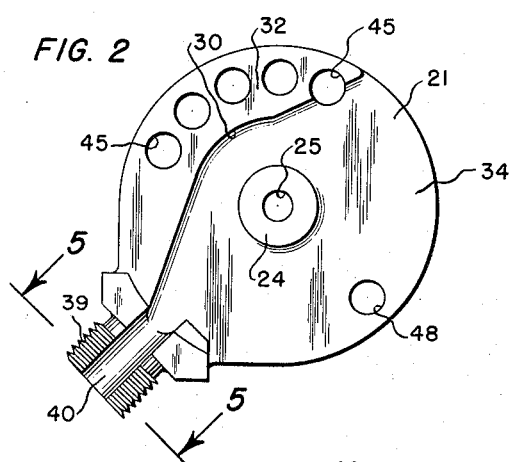
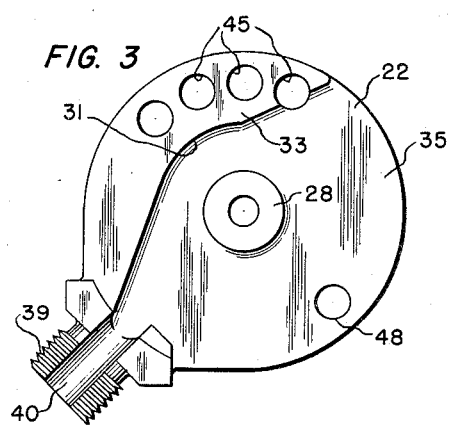
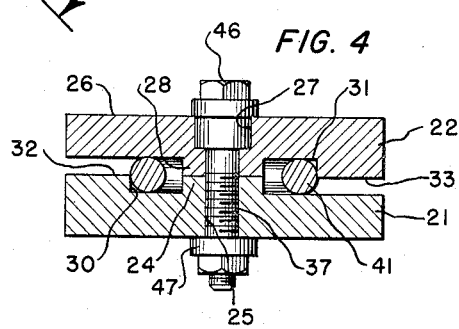
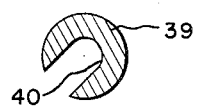
INVENTOR.
GORDON W. HARDY
BY *Fulwider, Mattingly & Huntley*
ATTORNEYS United States Patent Office 2,968,851
Patented Jan. 24, 1961

2,968,851
CABLE AND TUBE ANCHOR
Gordon Warren Hardy, 133 K St., Chula Vista, Calif.
Filed Aug. 25, 1958, Ser. No. 757,010
7 Claims. (Cl. 24—135)

The present invention relates to an anchor for an intermediate section of a cable or tube.

The invention comprises two clamping elements having confronting face and transversely extending shoulder forming a channel for receiving the cable or tube. The elements are shiftable relative to one another to vary the shape of the channel and can be drawn, under pressure, toward one another to clamp the cable or tube, while in the channel, against the confronting faces of the elements. Each of the elements is provided with a series of holes; at least two of which holes are alignable in various shifted positions of the elements whereby a clevis pin can be extended through both elements.

In carrying out the invention, the shifting, above referred to, is through rotation of one element relative to the other.

The construction further contemplates extending the cable or tube through a nipple which forms a part of one of the clamping elements. The nipple is slotted longitudinally so as to receive the cable or tube through the side of the nipple. A complementary element, C-shaped in radial cross section, has its yoke portion overlying a portion of the open side of the slot in the nipple, and is suitably locked in position by a slotted locking element. The slots in the nipple, the C-shaped element, and the locking element are each of sufficient width to receive the cable or tube. The C-shaped element is preferably formed of ductile material and suitable shoulders are formed on the nipple and locking element for engaging the ends of the C-shaped element whereby, when the elements are locked together, the C-shaped element tightly grasps the cable or tube.

Further objects and advantages will be apparent from the following description reference being had to the accompanying drawing wherein a preferred embodiment of the invention is illustrated.

In the drawings:

Fig. 1 is a plan view in elevation showing the two clamping elements in locked position, part of one of the couplings being shown in section;

Figs. 2 and 3 are views showing the confronting sides of the clamping elements;

Fig. 4 is a sectional view taken on line 4—4 of Fig. 1;

Fig. 5 is a sectional view taken on line 5—5 of Fig. 2;

Fig. 6 is a perspective view of one of the coupling parts;

Fig. 7 is a perspective view of one of the packing glands; and

Fig. 8 is a sectional view taken on line 8—8 of Fig. 1.

Referring to the drawings, an anchor 20 comprises two clamping elements 21 and 22. These elements are the same except that the center boss 24 of the element 21 is internally threaded as at 25, while the outer face 26 of the clamping element 22 is countersunk as at 27 on an axis parallel with the boss 28.

Each of these elements is provided with a shoulder; the shoulder of the clamping element 21 is indicated by the numeral 30; and the shoulder of the clamping element 22 is indicated by the numeral 31. These shoulders 30 and 31 are formed by projecting portions 32 and 33 respectively. The face 34 of element 21 confronts the face of element 22, and the portion 33 of element 22 overlies the portion 34 of element 21. A screw 37 extending through the element 22 is threaded into the threaded portion 25 of element 21.

The shoulders 30 and 31 and the bosses 24 and 28 form a channel for receiving a cable or tube. The depth of the channel is slightly less than the width of the cable so that when the screw 37 is tightened, the cable or tube will be clamped in position.

Each of the clamping elements 21 and 22 is provided with a nipple 39 having a bore 40. The nipple 39 is slotted longitudinally and into the bore 40. The bottom of the bore 40 of the nipple on element 21 lies substantially in the plane of the face 34 of element 21, and the top of the bore 40 of the nipple on element 22 lies substantially in the plane of the face 35 of element 22. The cable or tube 41 is laid in the bores 40 and the channel, and then the screw 37 is tightened. Elements 21 and 22 are rotatably mounted with respect to one another on the screw 37 so that the relative position of the nipples can be changed to take care of the angle of the cable or tube.

As seen in Fig. 1, one portion 43 of the cable 41 is disposed at an angle of 90 degrees with respect to the portion 44. It will be understood that elements 21 and 22 can be shifted relative to one another on the pivot pin (screw 37). For example, element 22 can be shifted clockwise from the position shown in Fig. 1, so that the axes of the bores 40 of the nipples are aligned or to any desired intermediate position. Likewise element 22 can be shifted clockwise to a position in which the axes of bores 40 lie approximately at a 45 degree angle. Each of the clamping elements 21 and 22 is provided with a series of holes 45, at least two of each are alignable in any one of various shifted positions of the elements, whereby the clevis pin 46 of clevis 47 can be extended through both elements.

In the instant embodiment, the holes 45 are so spaced in both elements 21 and 22 so that at least one hole of each element is aligned with a hole of the other element when the nipple bores are at 22.5 degrees, 45 degrees, 67.5 degrees, 90 degrees, 112.5 degrees, 135 degrees, 157.5 degrees and 180 degrees. When they are at 180 degrees, two pairs of holes 48, each 90 degrees from the nipples, are aligned whereby two guy wires may be connected to extend at angles of 90 degrees with respect to cable or tube 41. Clevis 47 may have another guy wire if the cable 41 is a guy wire, or it may have an antenna wire or the like attached thereto.

If desirable, the portions 43 and 44 of the cable or tube 41 can be locked in position at the nipple or nipples 39. To accomplish this, an elongated gland 49, C-shaped in radial cross section, is placed over the cable portion with the yoke 50 of gasket 49 overlying the slot 40 in the nipple 39. The C-shaped gland is held in position by a locking element, herein shown as an internally threaded nut 52. This nut is also C-shaped in cross section and is threaded onto the outer end of the nipple 39.

A shoulder 53 surrounds the bore 40 of the nipple and a shoulder 54 is formed within the nut 52. The shoulder 54 of the nut 52 bears against the outer end of the C-shaped gland 49 and when the nut 52 is tightened the inner end of the C-shaped gland 49 is pressed against the shoulder 53 of the nipple. Either one of these shoulders may be tapered; preferably both shoulders are tapered so that the gland element, formed of ductile material, is pressed tightly against the tube or cable to lock the same in position.

From the foregoing, it will be seen that there has been provided an anchor for a cable or tube by which the integral cable or tube sections, that may extend at any one of various angles from one another, are securely held at the desired angle. The cable or tube sections are secured at the desired angle by the confronting faces of the clamping elements 21 and 22, and the cable or tube is further secured to the anchor by the locking nut 52 and gland 49.

Also by the present construction, the anchor or clamp can be secured to an intermediate portion or section of a cable or tube, since the elements of the anchor are attachable about the cable or tube.

Thus the present invention materially simplifies the attachment of an anchor to a cable or tube, and can be manufactured at a relatively low cost.

While the form of mechanism herein described constitutes a preferred form, it is to be understood that other forms may be adopted falling within the scope of the claims that follow.

I claim:

1. An anchor for an intermediate section of a cable or tube, comprising two clamping elements forming confronting faces, transversely extending shoulders between the faces and spaced from one another to define with the faces a channel for a cable or tube; a fulcrum on one of the elements for rotatably supporting the other of said elements, the axis of the fulcrum lying perpendicular of the faces, one of said elements having at least one hole, the other of said elements having a plurality of holes spaced equal distances from the said axis as the hole in the said element and each being registerable with the hole in the said one element for receiving an anchoring pin, each of said elements having an outwardly extending nipple for receiving the cable or tube; and means for drawing the elements toward one another for clamping a cable or tube therebetween.

2. An anchor for an intermediate section of a cable or tube, comprising two clamping elements forming confronting faces, transversely extending shoulders between the faces and spaced from one another to define with the faces a channel for a cable or tube, one of said shoulders being substantially cylindrical; a fulcrum on one of the elements for rotatably supporting the other of said elements, the axes of the fulcrum and said latter shoulder coinciding and lying substantially perpendicular of the faces, one of said elements having at least one hole, the other of said elements having a plurality of holes spaced equal distances from the said axes as the hole in said element and each being registerable with the hole in the said one element for receiving an anchoring pin, each of said elements having an outwardly extending nipple for receiving the cable or tube; and means for drawing the elements toward one another for clamping a cable or tube therebetween.

3. An anchor for an intermediate section of a cable or tube, comprising two clamping elements forming confronting faces, transversely extending shoulders between the faces and spaced from one another to define with the faces a channel for a cable or tube, at least portions of said shoulders being substantially concentrically arranged; a fulcrum on one of said elements for rotatably supporting the other of said elements, the axes of the fulcrum and the concentrically arranged portions of the shoulders substantially coinciding, one of said elements having at least one hole, the other of said elements having a plurality of holes spaced equal distances from the said axes as the hole in said element and each being registerable with the hole in the said one element for receiving an anchoring pin, each of said elements having an outwardly extending nipple for receiving the cable or tube; and means for drawing the elements toward one another for clamping a cable or tube therebetween.

4. A coupling for a cable or tube comprising in combination, an element to which the cable or tube is attached, said element having a nipple extending therefrom, said nipple being slotted longitudinally of the bore thereof for receiving a part of the cable or tube along the length of the cable or tube, the width of the slot being substantially equal to the diameter of the bore, a shoulder about the bore facing outwardly; an elongated gland of ductile material and C-shaped in radial cross section, the inner end of the gland engaging the shoulder, and the yoke of the gland overlying the outer end of the slot of the nipple; and a gland compressing element, C-shaped in cross section, having an internal shoulder engaging the outer end of the gland, the mouths of the C-shaped gland and the C-shaped compressing element having widths substantially equal to the width of the bore in said nipple, said nipple and gland compressing element having means for securing the latter element to the nipple with the gland compressed against the shoulder in the nipple.

5. A coupling for a cable or tube comprising in combination, an element to which the cable or tube is attached, said element having a nipple extending therefrom, said nipple being slotted longitudinally of the bore thereof and to the bore for receiving a part of the cable or tube along the length of the cable or tube, the width of the slot being substantially equal to the diameter of the bore, a shoulder about the bore facing outwardly; an elongated gland of ductile material and C-shaped in radial cross section, the inner end of the gland engaging the shoulder, and the yoke of the gland overlying the outer end of the slot of the nipple; and a gland compressing element, C-shaped in cross section, having an internal shoulder engaging the outer end of the gland, said nipple and gland compressing element being threadedly attached to one another with the gland compressed against the shoulder in the nipple, the mouths of the C-shaped gland and the C-shaped compressing element having widths substantially equal to the width of the bore in said nipple.

6. A coupling for a cable or tube comprising in combination, an element to which the cable or tube is attached, said element having a nipple extending therefrom, said nipple being slotted longitudinally of the bore thereof and to the bore for receiving a part of the cable or tube along the length of the cable or tube, the width of the slot being substantially equal to the diameter of the bore, a shoulder about the bore facing outwardly; an elongated gland, C-shaped in radial cross section, the inner end of the C-shaped gland being retained by said shoulder, and the yoke of the C-shaped gland overlying the outer end of the slot of the nipple; and a locking element, C-shaped in cross section, having an internal shoulder engaging the outer end of the C-shaped gland, said nipple and locking element having means for securing the same to one another and for securing the C-shaped gland in position, the mouths of the C-shaped gland and the C-shaped locking element having widths substantially equal to the width of the bore in said nipple.

7. An anchor for an intermediate section of a cable or tube comprising two clamping elements forming confronting faces, one of said elements having a nipple extending therefrom, said nipple being slotted longitudinally of the bore thereof, the width of the slot being substantially equal to the diameter of the bore, the bottom of the bore lying substantially in the plane of the said face of said element, said nipple having a shoulder about the bore facing outwardly; an elongated gland, C-shaped in radial cross section, the inner end of the C-shaped gland being retained by said shoulder, and the yoke of the C-shaped gland overlying the outer end of the slot of the nipple; and a locking element C-shaped in cross section having an internal shoulder engaging the outer end of the C-shaped gland, said nipple and locking element having means for securing the same to one another and for securing the C-shaped gland in position.

References Cited in the file of this patent

UNITED STATES PATENTS

| | | |
|---|---|---|
| 349,147 | Durand | Sept. 14, 1886 |
| 1,117,656 | Frederick et al. | Nov. 17, 1914 |

FOREIGN PATENTS

| | | |
|---|---|---|
| 576,335 | France | May 10, 1924 |